Oct. 19, 1965 J. A. RACCIO 3,212,193
GAUGING DEVICE
Filed Jan. 3, 1964 2 Sheets-Sheet 1

INVENTOR
JOSEPH A. RACCIO
BY
Stewart & Stewart
ATTORNEYS.

INVENTOR
JOSEPH A. RACCIO
BY Steward & Steward
ATTORNEYS.

United States Patent Office 3,212,193
Patented Oct. 19, 1965

3,212,193
GAUGING DEVICE
Joseph A. Raccio, 82 Bellevue Ave., West Haven, Conn.
Filed Jan. 3, 1964, Ser. No. 335,553
7 Claims. (Cl. 33—147)

This invention relates to gauging devices for measuring various dimensions of workpieces, especially screw-machine parts, and its relates more particularly to gauging devices capable of handling the work of a number of different measuring instruments, such as depth micrometers, dial comparators, dial test indicators, outside micrometers, blade micrometers, flush pin gauges, and surface plates, as well as others.

Tooling costs in the production of new products or parts constitute a substantial portion of the total cost involved in getting into production. This is partly due to the fact that in many cases special tools must be made for each job, which tools may have to be scrapped when the job is completed. Furthermore, in order for a machine shop to be in a position to accept a wide enough variety of jobs to provide a steady flow of work for its men and machines, the amount of expensive measuring tools and test equipment required is rather staggering, if not prohibitive for small job-shops at least.

It is therefore an object of the present invention to provide a relatively inexpensive testing apparatus which is capable of doing the work of many of the special tools and instruments presently required in the production of small parts. Another object of the invention is to provide a testing apparatus which can be set-up quickly and easily to take measurements for different jobs, thereby making it available for several different machine operators when it is needed so that each operator does not have to wait to use the testing equipment until another has completed his particular job.

In general the gauging device of the present invention comprises a surface plate and indicator-mounting post journaled for pivotal movement with respect to each other. The mounting post, which is located centrally of the surface plate, supports a visual indicator, for example a conventional dial indicator, in position for measuring the dimensions of workpieces positioned on the surface plate. An important feature of the invention is in the provision of work-positioning holes in the surface plate arranged so as to permit either the indicator to be swung on its mounting post from one piece of work to another, or alternatively, the workpieces to be brought one at a time into position under the indicator by rotating the surface plate relative to the indicator. The work-positioning holes are arranged in a circle about the mounting post, and the indicator is held by a bracket on the mounting post so that it can be adjustably positioned about the same distance from the mounting post as the work-positioning holes. Thus, the indicator may be shifted toward or away from its mounting post in order to locate the indicator laterally of the workpiece for taking the desired readings. In addition, the indicator-mounting bracket is adjustable longitudinally of the mounting post so that the indicator can also be readily adjusted toward and away from the surface plate. Consequently, both vertical and horizontal adjustments of the indicator can be quickly made so that little time is required in checking the dimensions of a particular piece of work even when the device has not previously been set up for that particular piece.

On the other hand, where several workpieces must be checked at one time, it is possible with the device of the present invention to place all of them on the surface plate at once and to swing the indicator from one workpiece to another at the work-positioning holes, taking readings of the dimensions to be checked on each. Where necessary the vertical or horizontal position of the indicator relative to the work can be changed by making suitable adjustments in its mounting bracket as the indicator is moved between pieces.

Other objects and advantages of the present invention will become apparent from the detailed description of certain embodiments of the invention shown in the accompanying drawings.

Figure 1:
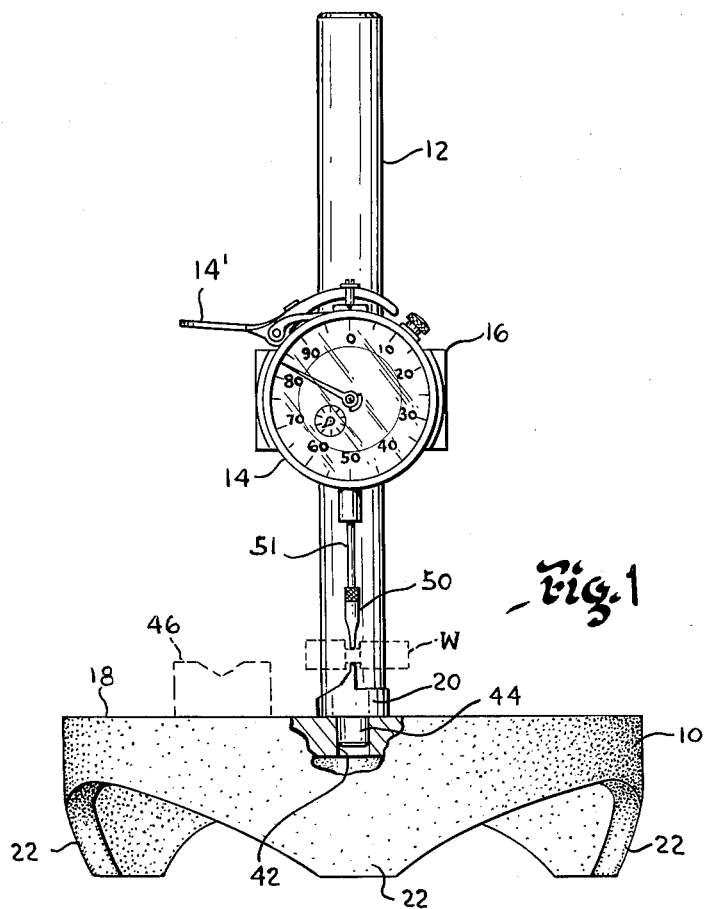
FIG. 1 is a front elevation of a gauging device according to the invention.

The embodiment of the invention illustrated in the drawings consists of a base 10 with a vertical mounting post 12 pivotally supported centrally of base 10. A dial indicator 14 is suspended on a bracket 16 to mounting post 12 so that it is in position for taking accurate measurements of a piece of work W on base 10, as shown in FIG. 1.

Figure 3:
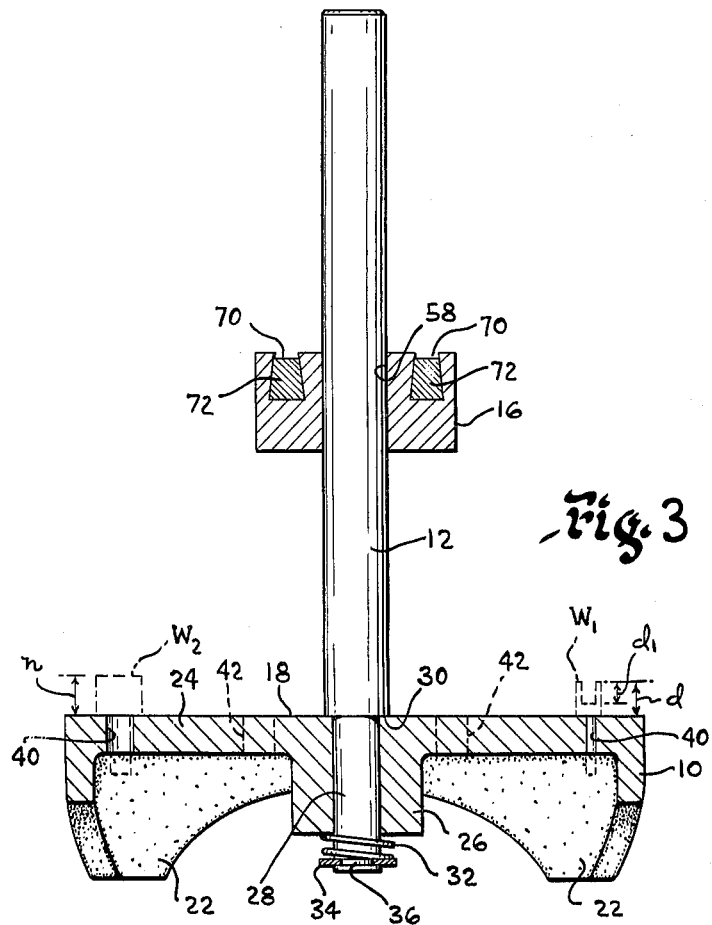
FIG. 3 is a vertical section taken on the line 3—3 in FIG. 2.

Base 10 has an accurately machined, flat, upper surface 18 commonly referred to as a surface plate, on which the workpieces are placed directly, as shown in FIG. 3, or indirectly where special work-holding mandrels, such as the blade block 20 (FIG. 1), are required in order to take readings of the desired dimensions. In this instance base 10 is circular in shape and hollowed out underneath like an inverted cup with vertical sides cut-away to form legs 22, which solidly support the testing apparatus on a suitable work bench or table (not shown). Legs 22 merge with the periphery of a horizontal top portion 24 of base 10, the upper circular surface 18 of which forms the surface plate.

Depending from the underside and centrally of the top 24, is a cylindrical boss 26 (FIG. 3) which forms a hub in which the lower end 28 of mounting post 12 is journaled. The journal portion 28 of post 12 is reduced in diameter in order to form an annular shoulder 30 which rests against the upper surface 18 of base 10, thus positively positioning post 12 in a vertical direction with respect to base 10. In order to prevent free pivotal movement of post 12 in boss 26 while at the same time providing smooth, frictional motion of said post so that indicator 14 may be swung from one place to another relative to surface 18, a coil spring 32 is compressed between the lower end of boss 26 and a split washer 34 positioned in a groove 36 adjacent the bottom of post 12. By selecting the right weight for spring 32 the proper amount of friction can be provided so that the dial indicator 14 will remain in the angular position at which it is set but can be easily swung on its mounting post 12 to any other position above the reference surface 18 on base 10. Spring 32 and washer 34 also hold post 12 so that it cannot be inadvertently lifted off of base 10.

It will of course be understood that it is important for the longitudinal axis of the cylindrical bearing surface in boss 26 in which post 12 is journaled to be exactly perpendicular to the surface 18 of base 10 and for the journal-portion 28 of post 12 to accurately fit within this hole so that post 12 does not tilt with respect to base 10. In this connection it will be observed that any slight tilting of post 12 in its journal-boss 26 will be eliminated by the action of coil-spring 32 which draws shoulder 30 of post 12 down and firmly seats it against the upper surface 18 of base 10.

Figure 2:
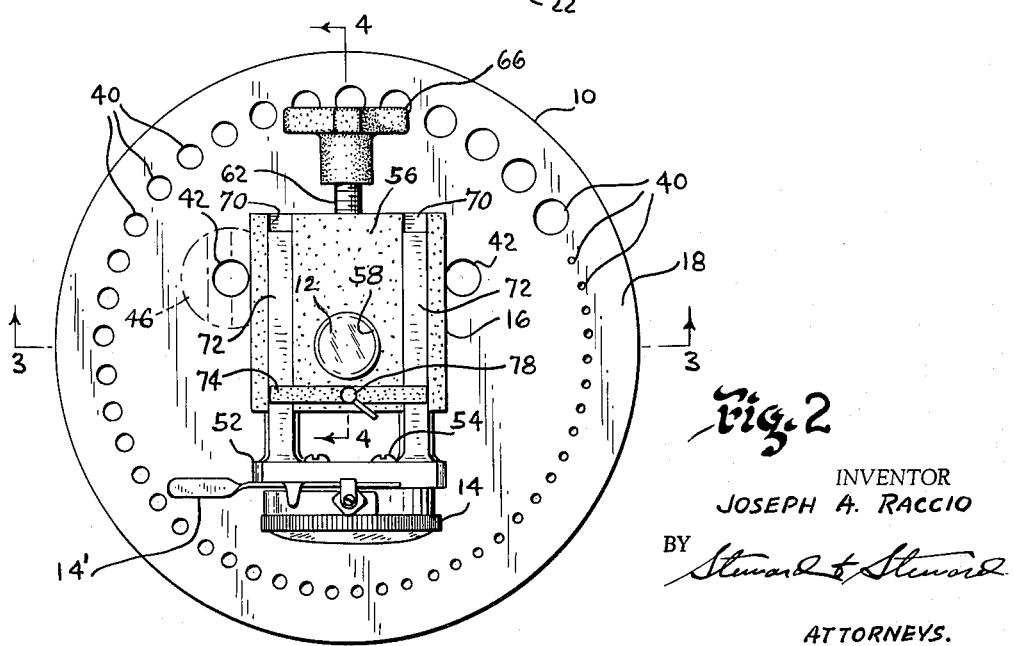
FIG. 2 is a top plan view thereof.

Referring now more particularly to FIGS. 2 and 3, it will be seen that the top portion 24 of base 10 is provided with a series of holes 40 of graduated standard sizes arranged in a circle about mounting post 12. Holes 40 may range in size, for example, from a No. 60 drill size to a ½" hole, and may include any or all of the sixty drill sizes, as well as the twenty-six letter and nine standard fractional sizes. In practice certain of these sizes are more commonly used than others, and therefore only the more common sizes need be provided. The centers of holes 40 are shown as being arranged in a circle equidistant from the center of mounting post 12. However, it will be understood that, if desired, in order to provide more sizes, holes 40 can be arranged with their centers at two different distances from post 12 and with every other hole staggered, first at one distance and the next at the other distance, thus forming two concentric circles of holes around post 12. In addition, there are also provided in the construction shown three equally spaced holes 42 in the surface plate of base 10 within the outer circle of graduated holes 40. In this instance holes 42 are, for convenience sake, of equal size and equidistant from post 12 for a reason to be brought out hereinafter. As may be seen in FIG. 3 holes 40 and 42 extend from the upper surface 18 of base 10 vertically through the top portion 24 into the hollow space on the underside of the base.

Workpieces having projections which fit within any of holes 40 may be positioned directly on the surface plate. For example, the workpiece $W_1$ which is to be checked for the dimensions $d$ and $d'$, has a narrow cylindrical stem extending from one side which will fit snugly in one of the holes 40 in the surface plate so that the underside of the workpiece rests squarely on the surface 18. Similarly the dimension $h$ of workpiece $W_2$ is to be checked, this workpiece having a larger size projection which will fit one of the larger holes 40 in the surface plate. Obviously the smaller hole which is suitable for the piece $W_1$ will not accommodate the piece $W_2$, while on the other hand the piece $W_1$ would not be held snugly enough in the larger hole used for the piece $W_2$, or might even drop clear through it. The wide range of sizes of holes 40 therefore provide a good selection for directly postioning a large number of different workpieces on the surface plate.

The three inner holes 42 on the other hand are uniform in diameter and fairly large in diameter in order to accommodate a locating stud 44 (FIG. 1) of corresponding diameter on any one of various different mandrels, such as the previously mentioned blade-block 20 which is adapted to reach to the bottom of the narrow groove formed in the workpiece W. Similarly, where cylindrical work (not shown) can not be easily positioned at the holes 40 for taking a reading by means of the dial indicator 14, a V-block 46 with a locating stud like the stud 44 on blade-block 20 may be used for holding the cylindrical workpiece in a horizontal position. Thus, various attachments like the mandrels 20 and 46 indicated in FIG. 1, may be quickly and easily set in holes 42 on the surface 18 of the base in order to hold work which cannot be conveniently positioned directly on the surface plate by any of the work-positioning holes 40. It will accordingly be appreciated that a wide variety of workpieces of different shapes and sizes can be accurately held in position with respect to a reference plane so that readings of dimensions extending perpendicular to such reference plane can be taken with a minimum of time and effort.

The dial indicator 14 illustrated in the drawing is desirably a commercially available instrument with a relatively long range for ease in taking readings and having a lever 14' for manually raising its contact point 50 on the spindle 51 of the indicator. In order that the contact 50 may be brought into proper vertical alignment with workpieces located by means of holes 40 or 42 in base 10 at any position on the surface 18, the indicator bracket 16, by which indicator 14 is supported on mounting post 12, is provided with means for moving the indicator radially of post 12. To this end, bracket 16 consists of two parts: an indicator-mounting part 52 to which the indicator 14 is fastened by means of mounting screws 54, and a clamping block 56, by which bracket 16 is rigidly clamped to post 12. As will be described in greater detail hereinafter, indicator-mounting part 52 slides perpendicularly to post 12 on clamping block 56 to move indicator 14 toward or away from post 12.

Clamping block 56 has a vertical hole 58 near its center, through which post 12 extends. A passage 60 (FIG. 4) is drilled horizontally into hole 58 through its side opposite indicator 14, and the outer portion of passage 60 is threaded to receive a clamping screw 62. A soft-metal insert 64 is provided at the inner end of passage 60, against which the end of clamping screw 62 rests in order to protect the surface of post 12. By turning-down and backing-off on clamping screw 62, using its hand knob 66, the indicator bracket 16 is alternately rigidly fixed to mounting post 12 and released from it for vertical sliding adjustment thereon.

The upper side of clamping block 56 is provided with two parallel grooves 70 extending parallel to clamping screw 62 and disposed one on each side of mounting post 12. Grooves 70 receive in longitudinally slidable cooperation therewith a pair of slide bars 72 which project rearwardly from, and are a part of the indicator-mounting part 52. As may be seen in FIG. 3 slide bars 72 and grooves 70 are dovetail-shaped in cross-section so that bars 72 are permitted only longitudinal sliding movement in grooves 70. In this manner indicator 14 may be moved radially of the mounting post 12 in order to take readings on workpieces which may be positioned at the inner holes 42, or on pieces which may be located at one of the outer holes 40.

Figure 4:
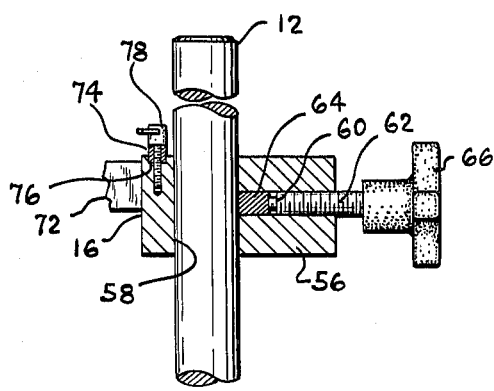
FIG. 4 is a sectional view of the indicator-mounting bracket taken on the line 4—4 in FIG. 2.

In order to lock the indicator 14 in radial adjustment, a clamping bar 74 (FIGS. 2 and 4) is provided in a transverse groove 76 formed in the upper surface of clamping block 56 adjacent the indicator 14. Opposite ends of clamping bar 74 overlap the slide bars 72 of the indicator mounting part 52 for clamping engagement therewith. A locking screw 78 extends vertically through and transversely of clamping bar 74 centrally thereof, and threadedly engages block 56, as shown in FIG. 4, for tightening clamping bar 74 down against slide bars 72, thereby locking them in place. It will of course be understood that transverse groove 76, in which clamping bar 74 is located, is deep enough to allow bar 74 to rest on the upper edges of slide bars 72 and to be brought into gripping engagement therewith by the locking screw 78.

From the foregoing it will be seen that in order to take a reading on the workpiece $W_1$ (FIG. 3), for example, the operator desiring such reading may find the test apparatus set up for the work W as shown in FIG. 1. He will in that event locate the work-positioning hole 40 on the surface plate which most nearly fits the stem of the piece $W_1$ and place the work at this position on the surface 18 of base 10 as indicated in FIG. 3. Since the contact point 50 of the dial indicator in this particular case is already set high enough to clear the workpiece $W_1$, the vertical adjustment of the indicator 14 on its bracket 16 need not be changed. However, if the contact 50 happened to be set low, it might be necessary to first raise indicator 14 by loosening clamping screw 62, sliding the bracket and indicator up on post 12 and tightening screw 62 again.

The indicator is then swung angularly on post 12, which pivots in the base 10 as hereinbefore described, until the contact is about lined-up with the workpiece $W_1$. At the same time, the clamping bar 74 is released so that the indicator mounting part 52 can be extended outwardly to move the indicator radially of the post 12 until it is next to the workpiece $W_1$. For taking the readings indicated for the workpiece $W_1$, the indicator is then brought down on the mounting post 12 by releasing the clamping screw 62 until the contact 50 engages the surface 18 of base 10, where the indicator is clamped in vertical adjustment. The dial of indicator 14, is then set on zero in the usual manner and the contact 50 raised by the lever 14′ until it clears the uppermost surface of the workpiece. The indicator is then moved laterally over the work by pivoting the mounting post 12 and indicator 14 as a unit, so that contact 50 may be brought into engagement with the desired surface of the workpiece in order to obtain a reading for the dimension $d$. The operation is similar for taking a reading of the dimension $d_1$.

It will thus be apparent that due to the relationship of the pivotal mounting post and the radial adjustment of the dial in the mounting post, together with the positioning holes in the surface plate arranged in circles about the mounting post, the indicator may be quickly shifted from one workpiece to another, thus making the present gauging device extremely versatile and useful in performing many jobs which no one piece of equipment has been capable of handling heretofore.

What is claimed is:

1. A gauging device for measuring a workpiece comprising a surface plate and a post journaled centrally thereof for pivotal movement of said surface plate and post relative to each other, said surface plate having a plurality of cylindrical holes formed therein for positioning a plurality of workpieces to be tested, the centers of said holes being disposed substantially equidistant from said post, a bracket supported on said post for adjustment longitudinally thereof with means for rigidly clamping said bracket to said post, and a visual indicator mounted on said bracket in spaced dimension-taking relation with said surface plate, said bracket having means for adjustably positioning said indicator radially of the longitudinal axis of said post such that said indicator may be positioned substantially the same distance from said post as said work-positioning holes in said surface plate at a required height above said surface plate.

2. A gauging device as defined in claim 1, wherein said surface plate is stationary and said indicator and post pivot in unison on said surface plate so that said indicator may be swung from one workpiece to another at said work-positioning holes.

3. A gauging device as defined in claim 1, wherein said work-positioning holes are graduated in size in order to accommodate workpieces of various sizes.

4. A gauging device as defined in claim 3, which includes a second set of work-positioning holes disposed at a different distance from said post than said first-named work-positioning holes, the centers of the holes in said second set being substantially equidistant from said post.

5. A gauging device as defined in claim 4, wherein said second set of work-positioning holes are uniform in diameter and which further includes a work-holding mandrel having a cylindrical lug of a diameter corresponding to the holes in said second set of work-positioning holes for positively locating said work-holding mandrel at a predetermined distance from said post.

6. A gauging device as defined in claim 1, wherein said post is formed with a downwardly facing shoulder adjacent said surface plate for engagement therewith, the plane of said shoulder being perpendicular to the longitudinal axis of said post and parallel to the plane of said surface plate, together with means for resiliently urging said shoulder of said post and said surface plate into engagement.

7. A gauging device as defined in claim 6, wherein said post projects through said surface plate with said shoulder engaging the upper face of said surface plate, said resilient means comprising a coil spring surrounding the projecting end of said post and compressed between the underside of said surface plate and a stop adjacent the lower end of said post.

No references cited.

ISAAC LISANN, *Primary Examiner.*